US006845965B2

(12) United States Patent
Lanting et al.

(10) Patent No.: US 6,845,965 B2
(45) Date of Patent: Jan. 25, 2005

(54) PRESSURIZED VALVE SEAL

(75) Inventors: Henry A. Lanting, Kitchener (CA); Po P. Woo, Guelph (CA)

(73) Assignee: Teleflex GPI Control Systems L.P., Kitchener (CA)

( * ) Notice: Subject to any disclaimer, the term of this patent is extended or adjusted under 35 U.S.C. 154(b) by 0 days.

(21) Appl. No.: 10/124,404

(22) Filed: Apr. 18, 2002

(65) Prior Publication Data

US 2004/0075072 A1 Apr. 22, 2004

(51) Int. Cl.[7] ............................................. F16K 25/02
(52) U.S. Cl. ...................................................... 251/175
(58) Field of Search ................................ 251/170, 171, 251/172, 175

(56) References Cited

U.S. PATENT DOCUMENTS

| 848,178 | A | | 3/1907 | Kingsley | |
|---|---|---|---|---|---|
| 873,984 | A | | 12/1907 | Bobrick | |
| 1,716,896 | A | * | 6/1929 | Miller | ........................ 251/175 |
| 2,111,430 | A | | 3/1938 | Lamar | |
| 2,551,501 | A | | 5/1951 | Mitchell et al. | |
| RE25,251 | E | * | 10/1962 | Quail | ........................ 251/175 |
| 3,278,728 | A | | 10/1966 | Ragsdale | |
| 3,589,676 | A | * | 6/1971 | Erickson et al. | ............ 251/172 |
| 3,605,802 | A | | 9/1971 | Hertell | |
| 3,665,959 | A | | 5/1972 | Castillon | |
| 3,698,687 | A | * | 10/1972 | Kitamura | ..................... 251/172 |
| 3,754,568 | A | | 8/1973 | Gallagher et al. | |
| 3,951,379 | A | | 4/1976 | Cornelius | |
| 4,016,899 | A | | 4/1977 | Fletcher | |
| 4,188,015 | A | * | 2/1980 | Halpine | ....................... 251/172 |
| 4,307,748 | A | | 12/1981 | Mathias | |
| 4,434,765 | A | | 3/1984 | Eshelman | |
| 4,530,373 | A | | 7/1985 | Bork et al. | |
| 4,645,174 | A | | 2/1987 | Hicks | |
| 4,848,394 | A | | 7/1989 | Rothschild | |
| 5,193,580 | A | | 3/1993 | Wass et al. | |
| 5,238,030 | A | | 8/1993 | Miller et al. | |
| 5,259,424 | A | | 11/1993 | Miller et al. | |
| 5,351,726 | A | | 10/1994 | Diggins | |
| 5,357,809 | A | | 10/1994 | Vander Heyden | |
| 5,392,825 | A | | 2/1995 | Mims et al. | |
| 5,452,738 | A | | 9/1995 | Borland et al. | |
| 5,474,104 | A | | 12/1995 | Borland et al. | |
| 5,542,459 | A | | 8/1996 | Price et al. | |
| 5,597,020 | A | | 1/1997 | Miller et al. | |
| 5,653,269 | A | | 8/1997 | Miller et al. | |
| 5,785,082 | A | * | 7/1998 | Geis et al. | ................... 251/172 |
| 6,176,263 | B1 | * | 1/2001 | Lacroix et al. | .............. 251/175 |

FOREIGN PATENT DOCUMENTS

| EP | 409401 | 1/1991 |
|---|---|---|
| EP | 634633 | 1/1995 |
| IT | 560772 | 4/1957 |
| JP | 62-037700 | 8/1987 |
| JP | 08-159397 | 6/1996 |
| JP | 9210296 | 8/1997 |
| WO | WO 9300264 | 1/1993 |

OTHER PUBLICATIONS

Parker Hannifin Corporation Brochure Nov. 1992.
Staubli Corporation Brochure Mar. 1992.
Sherex Industries Brochure Sep. 1991.
Sherex Industries Brochure Apr. 1992.
Sherex Industries Brochure Dec. 1991.
B.S. Massey, "Mechanics of Fluids", pp. 406–413.
G.F.C. Rogers & Y.R. Mayhew, "Engineering Thermodynamics", Chaper 18, pp. 370–381.

* cited by examiner

Primary Examiner—Eric Keasel

(57) ABSTRACT

A valve for controlling flow of a fluid exerting a fluid pressure. The valve has a body including a fluid passage for the fluid, and a valve seat positioned adjacent to the fluid passage at an orifice coaxial with the fluid passage. The valve seat includes a sealing gland defining a cavity therein, and the sealing gland has a support surface adjacent to the cavity and a resilient valve seat member within the cavity. The valve seat member includes a first pressure responsive surface adjacent to the orifice and a second pressure responsive surface substantially opposed to the first pressure responsive surface. The support surface includes a notch for positioning a portion of the support surface a distance apart from the second pressure responsive surface.

28 Claims, 8 Drawing Sheets

PRESSURIZED VALVE SEAL

FIELD OF INVENTION

This invention relates to valve seals, and particularly pressurized valve seals.

BACKGROUND OF THE INVENTION

Valves typically employ a resilient seating material, such as an o-ring, about the perimeter of a port or aperture. The resilient seating material is intended to engage and be compressed by a movable valve sealing member to effect sealing of the port or aperture. The seating material is disposed and contained within a sealing gland, provided in the body of the valve. In order to achieve desirable sealing properties, the seating material must be sealingly engaged to the sealing gland both upstream and downstream of the point of sealing engagement between the valve sealing member and the seating material. Under some operating conditions, the seating member moves away from the sealing gland, creating a flow path, allowing fluid to leak through the port or aperture even though the valve sealing member is sealingly engaged to the seating material. Under these circumstances, sealing engagement of the valve sealing member to the seating material is ineffective in sealing the port or aperture.

To mitigate this problem, it is known to pressurize the cavity within the sealing gland, to thereby provide fluid pressure forces to act upon the seating material, opposing those fluid pressure forces acting on the seating material from within the fluid passage, and thereby mitigating loss of sealing engagement between the seating material and the sealing gland. An example of such a pressurized seal is disclosed in U.S. Pat. No. 5,474,104.

Valves with pressurized seals continue to experience problems with maintaining sealing engagement of the seating surface against the sealing gland. Because the seating surface is pressed into the cavity of the sealing gland, the seating surface is sealingly engaged to the sealing gland at multiple points, thereby creating multiple individual cavities between the seating surface and the sealing gland. It is believed that fluid introduced into the sealing gland, for purposes of pressurizing the seal, does not access these individual cavities. As a result, fluid pressure introduced into the sealing gland cavity is not necessarily effective in opposing the fluid pressure forces acting on the seating member from within the fluid passage, thereby potentially compromising the sealing of the seating member to the sealing gland.

SUMMARY OF THE INVENTION

In its broad aspect, the invention provides a valve for controlling a fluid which exerts a fluid pressure. The valve includes a body, which has a fluid passage and a valve seat defining an orifice. The valve seat includes a sealing gland having a support surface, and the support surface includes a notch. The valve seat also includes a resilient valve seat member disposed within the sealing gland. In addition, the body includes a valve sealing member disposed within the fluid passage and configured to seat against the valve seat member to effect sealing of the valve sealing member to the valve seat and thereby to close the orifice. The notch is configured to facilitate the application of the fluid pressure on the valve seat member to prevent leakage through the orifice and between the valve sealing member and the sealing gland when the valve sealing member is seated against the valve seat member. The valve seat member includes a first pressure responsive surface exposed to the fluid passage, and including a valve engaging surface portion. The valve engaging surface portion is configured to engage the valve sealing member to effect sealing of the valve sealing member to the valve seat. The valve seat member also includes a second pressure responsive surface configured to receive the application of the fluid pressure. The notch is positioned to face the second pressure responsive surface. Also, the notch is configured to facilitate the application of the fluid pressure on the second pressure responsive surface to counterbalance applications of forces on the first pressure responsive surface.

In another aspect, the first pressure responsive surface is located on the valve seat member substantially opposite to the second pressure responsive surface.

In yet another aspect, the invention provides a valve for controlling a fluid exerting a fluid pressure. The valve has a body, which includes a fluid passage and a valve seat defining an orifice. The valve seat includes a sealing gland, a resilient valve seat member disposed within the sealing gland, and including a notch, and a valve sealing member disposed within the fluid passage and configured to seat against the valve seat member to effect sealing of the valve sealing member to the valve seat, and thereby to close the orifice. The notch is configured to facilitate the application of the fluid pressure on the valve seat member to prevent leakage through the orifice and between the valve sealing member and the sealing gland when the valve sealing member is seated against the valve seat member. Also, the valve seat member includes a first pressure responsive surface, exposed to the fluid passage, and including a valve engaging surface portion, in which the valve engaging surface portion is configured to engage the valve sealing member to effect sealing of the valve sealing member to the valve seat. The valve seat member also includes a second pressure responsive surface configured to receive the application of the fluid pressure. The notch is configured to facilitate the application of the fluid pressure on the second pressure responsive surface to maintain engagement of the valve seat member to the sealing gland upstream of the valve engaging surface.

In yet another aspect, the invention provides a valve for controlling a fluid exerting a fluid pressure. The valve includes a body having a fluid passage and a valve seat defining an orifice. The valve seat includes a sealing gland including a cavity, and a resilient valve seat member disposed within the sealing gland. The body also includes a valve sealing member disposed within the fluid passage and configured to seat against the valve seat member to effect sealing of the valve sealing member to the valve seat and thereby to close the orifice. The sealing gland includes two or more spaced apart apertures configured to distribute fluid pressure within the cavity to act upon the valve seat member to prevent leakage through the orifice when the valve sealing member is seated against the valve seat member. The spaced apart apertures are configured to facilitate the application of the distributed fluid pressure on the valve seat member to prevent leakage through the orifice and between the valve sealing member and the sealing gland when the valve sealing member is seated against the valve seat member.

In yet another of its aspects, the valve seat member includes a first pressure responsive surface exposed to the fluid passage, and including a valve engaging surface portion. The valve engaging surface portion is configured to engage the valve sealing member to effect sealing of the valve sealing member to the valve seat. In addition, the valve seat member also includes a second pressure responsive surface configured to receive the application of the distributed fluid pressure. The spaced apart apertures are configured to facilitate the application of the distributed fluid pressure within the cavity on the second pressure responsive surface to maintain engagement of the valve seat member to the sealing gland upstream of the valve engaging surface portion.

In another aspect, the invention provides a valve for controlling flow of a fluid exerting a fluid pressure. The valve has a body including a fluid passage for the fluid, and a valve seat positioned adjacent to the fluid passage. The valve seat includes a sealing gland having a sealing gland defining a cavity therein. The sealing gland has a support surface thereon adjacent to the cavity. The valve seat also includes a resilient valve seat member disposed and supported within the cavity. The valve seat member includes a first pressure responsive surface adjacent to the orifice and a second pressure responsive surface substantially opposed to the first pressure responsive surface. In addition, the support surface includes a notch for positioning a portion of the support surface a predetermined distance apart from the second pressure responsive surface. The body further includes a valve sealing member disposed in the fluid passage and movable between an engaged position, in which the valve sealing member is seated on the valve seat to block fluid flow through the orifice, and an open position, in which fluid flow through the orifice is permitted. Also, the body includes a resilient member for urging the valve sealing member into the engaged position. The fluid passage includes an upstream portion disposed upstream of the valve sealing member when the valve sealing member is in the engaged position, and a downstream portion disposed downstream of the valve sealing member when the valve sealing member is in the engaged position. The valve sealing member is urged into the open position by the fluid in the upstream portion. Also, the body includes a communication channel for fluid communication between the downstream portion and the cavity in the sealing gland, so that fluid pressure in the cavity acts upon the second pressure responsive surface to urge the valve seat member to seal the orifice when the valve sealing member is in the engaged position.

BRIEF DESCRIPTION OF DRAWINGS

The embodiments of the present invention are described below with reference to the accompanying drawings in which.

DETAILED DESCRIPTION

Figure 1:
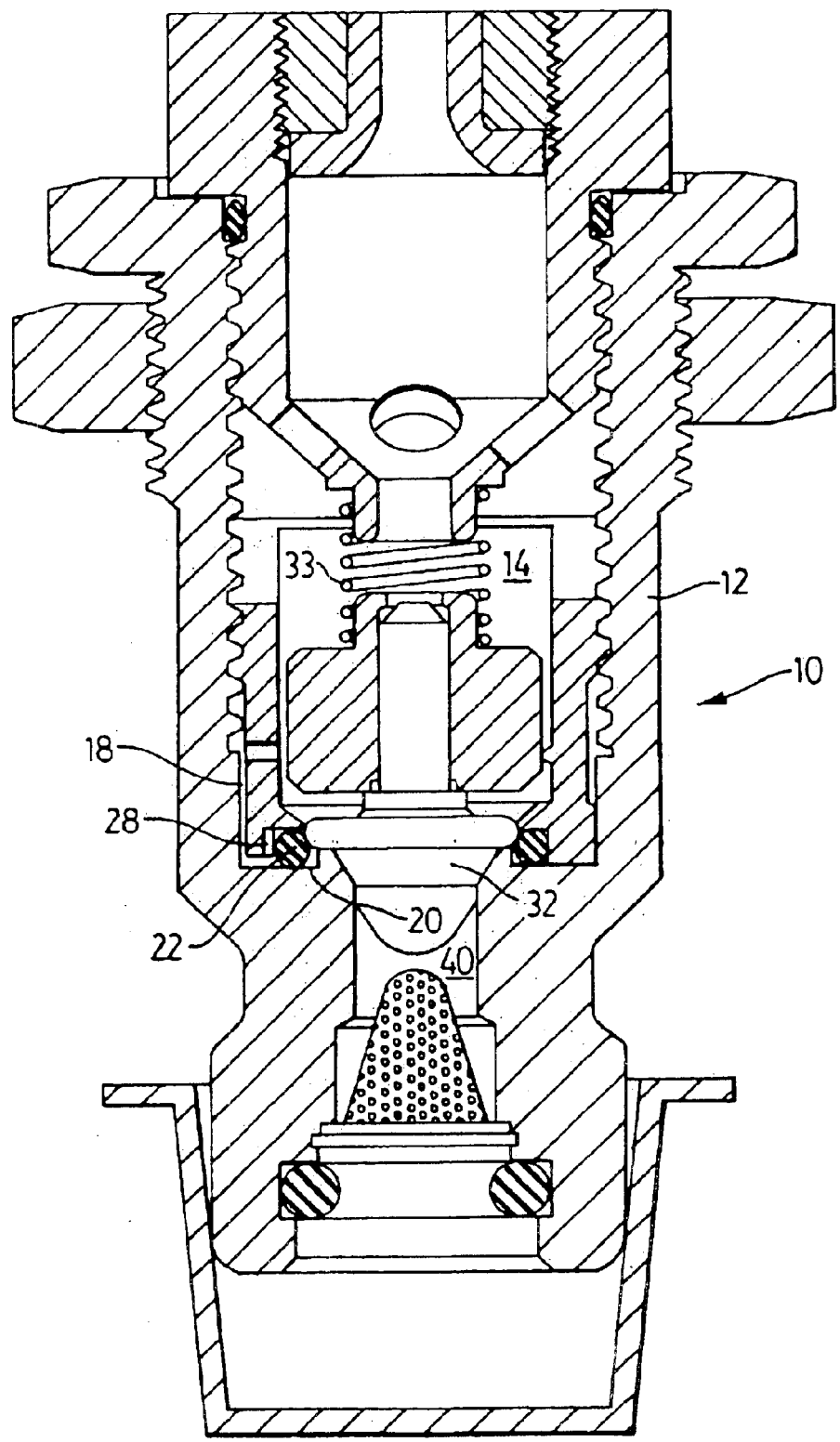
FIG. 1 is a sectional elevation view of an embodiment of the valve of the present invention.
Figure 3:
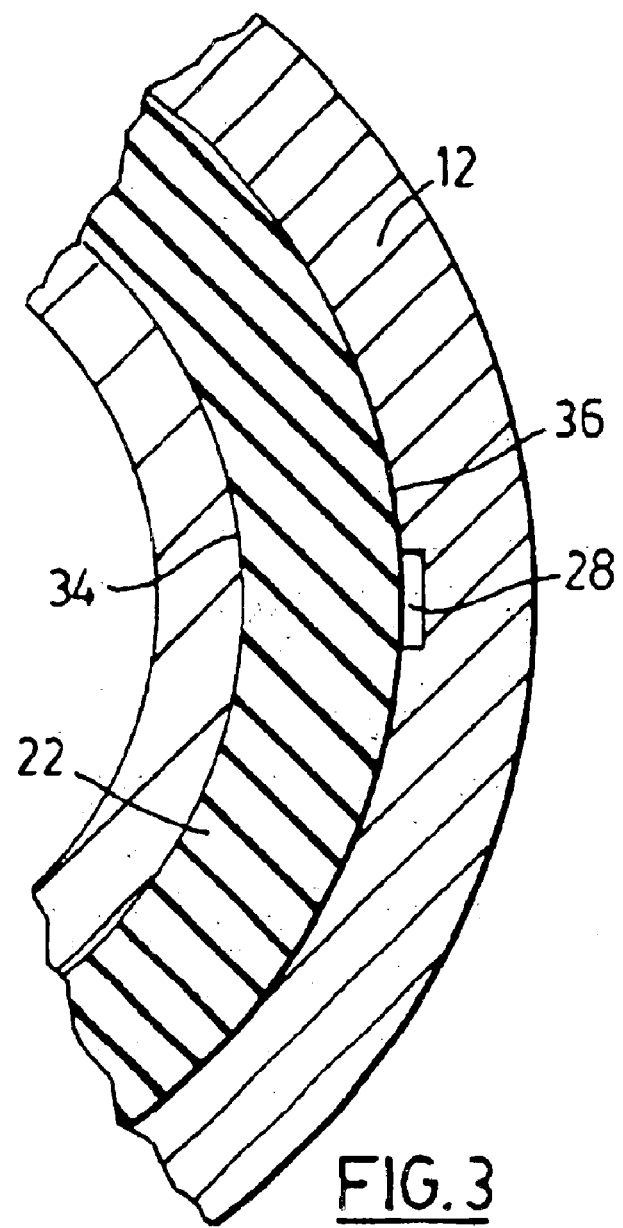
FIG. 3 is a plan view of the valve illustrated in FIGS. 1 and 2, taken along the lines 3—3 in FIG. 2.

Referring to FIGS. 1, 3, in one embodiment, the present invention provides a valve 10 comprising a body 12 including a fluid passage 14, a valve seat 16, and a communication channel 18. The valve seat 16 includes a sealing gland 20 and a resilient valve seat member 22 disposed and supported within a cavity 24 of the sealing gland 20. The sealing gland 20 has a support surface 26 including a notch 28. The notch 28 defines a channel which forms part of the cavity 24. The communication channel 18 effects communication between the fluid passage 14 and the cavity 24, and, therefore, the notch 28, through an aperture 30 provided in the sealing gland 20. In this respect, the communication channel 18 provides a means for effecting communication between the cavity 24 and a source of fluid pressure (in this case, the fluid passage).

The body 12 is made of a material which is significantly harder than the material of construction of the valve seat member 22. The valve seat member 22 is made of a resilient material, such as an elastomeric rubber, for example, nitrile rubber. In turn, the body is made of steel, such as stainless steel, brass, or a hard polymer.

A valve sealing member 32 is disposed within the passage 14. The valve sealing member 32 is configured to seal against the valve seat 16. In this respect, the valve sealing member 32 is configured to seat against the valve seat member 22 which is disposed within the sealing gland 20 of the valve seat 16.

The valve sealing member 32 can be of the form which is biassed to close an orifice 35 defined by the valve seat 16. In this respect, the valve sealing member 32 can be urged into engagement with the valve seat member 22 by a resilient member 33, such as a compression spring. The valve sealing member 32 is unseated by fluid pressure upstream of the valve sealing member 32 (ie. in a direction opposite from the direction in which the force imparted by the resilient member acts upon the valve sealing member 32). It is understood that the present invention is not limited to such spring-loaded, one way valves. For example, the present invention may be incorporated in solenoid-actuated valves and pintle valves.

The valve seat member 22 includes a first pressure responsive surface 34 and a second pressure responsive surface 36. The first pressure responsive surface 34 is exposed to the fluid passage. The second pressure responsive surface 36 is configured to receive application of a fluid pressure from within the cavity 24, and is opposite the first pressure responsive surface 34.

The first pressure responsive surface 34 is configured to engage the valve sealing member 32 to effect sealing of the valve sealing member 32 to the valve seat 16. The first pressure responsive surface 34 receives application of forces from the valve sealing member 32 (when the valve sealing member 32 engages the first pressure responsive surface 34) and the fluid pressure forces in the fluid passage 14. The first pressure responsive surface 34 includes a valve engaging surface 38, configured to engage the valve sealing member 32.

Sealing of the valve sealing member 32 to the valve seat 16 requires that the valve seat member 22 bridge the gap across the sealing gland 20 upstream 40 of the valve engaging surface 38. In this respect, the valve seat member 22 is maintained engaged to the sealing gland 20 upstream 40 of the valve engaging surface 38 of the first pressure responsive surface 34.

The valve seat member can be in the form of an o-ring or any other compliant seal of various cross-sectional shapes.

To maintain the necessary engagement between the valve seat member 22 and the sealing gland 20, a fluid pressure is introduced into the cavity 24 of the sealing gland 20 to act upon the second pressure responsive surface 36. In this respect, this fluid pressure opposes or counterbalances the above-described forces acting on the first pressure responsive surface 34 such that the valve seat member 22 remains engaged to the sealing gland 20.

Figure 2:
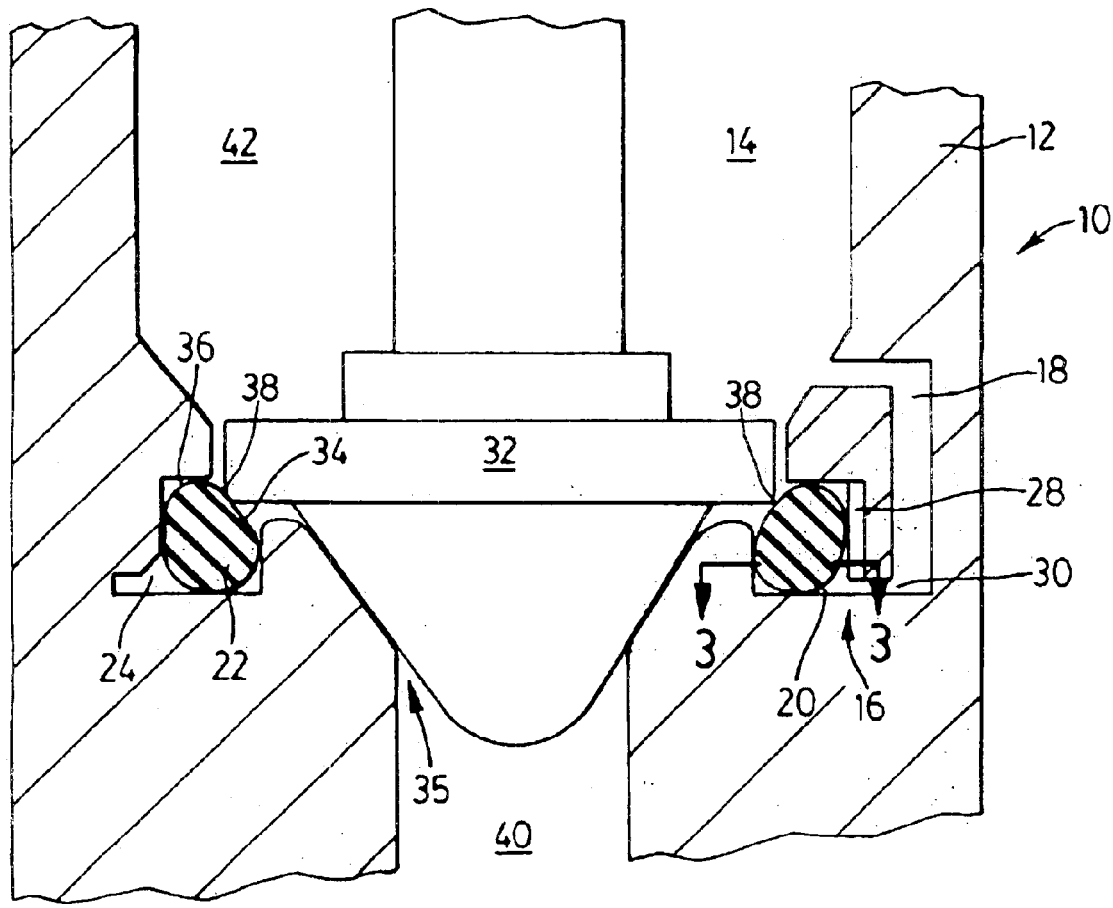
FIG. 2 is a detailed sectional elevation view, partly cut-away, of the valve seat area of the valve illustrated in FIG. 1.

As perhaps best illustrated in FIG. 2, the notch 28 is deliberately formed in the support surface 26 of the sealing gland 20, and functions as a channel to effect distribution of fluid pressure through the cavity 24, the fluid pressure being introduced into the cavity 24 through the aperture 30 in the sealing gland 20. In this respect, the notch 28 and the valve seat member 24 are co-operatively configured so that the valve seat member 22 is not capable, upon deformation, of sealing the channel defined by the notch 28. The notch 28 is provided to mitigate against the risk that the valve seat member 22 engages the sealing gland 20 and impedes distribution of fluid pressure through the cavity 24. By impeding distribution in this manner, the effectiveness of the introduced fluid pressure in opposing or counterbalancing the above-described forces being applied to the first pressure responsive surface 34 would be compromised.

In this respect, the notch 28 opposes the second pressure responsive surface 36 of the valve seat member 22, and is configured to facilitate application of a fluid pressure on the valve seat member 22, and specifically the second pressure responsive surface 36 of the valve seat member 22 to prevent leakage through the orifice 35 when the valve sealing member 32 is seated against the valve seat member 22. Similarly, the notch 28 is also configured to facilitate the application of the fluid pressure on the valve seat member 22 to prevent leakage through the orifice 35 and between the valve sealing member 32 and the sealing gland 20 when the valve sealing member 32 is seated against the valve seat member 22. The notch 28 is also configured to facilitate application of the fluid pressure on the second pressure responsive surface 36 to counterbalance the application of the above-described forces on the first pressure responsive surface 34 of the valve seat member 22.

In one embodiment, the notch 28 is characterized by a depth of at least 0.00254 millimeters (100 microinches). In another embodiment, the depth of the notch is at least 0.0254 millimeters (0.001 inches). Preferably, the notch 28 is characterized by a depth of from 0.508 millimeters (0.020 inches) to 0.762 millimeters (0.030 inches).

Figure 4:
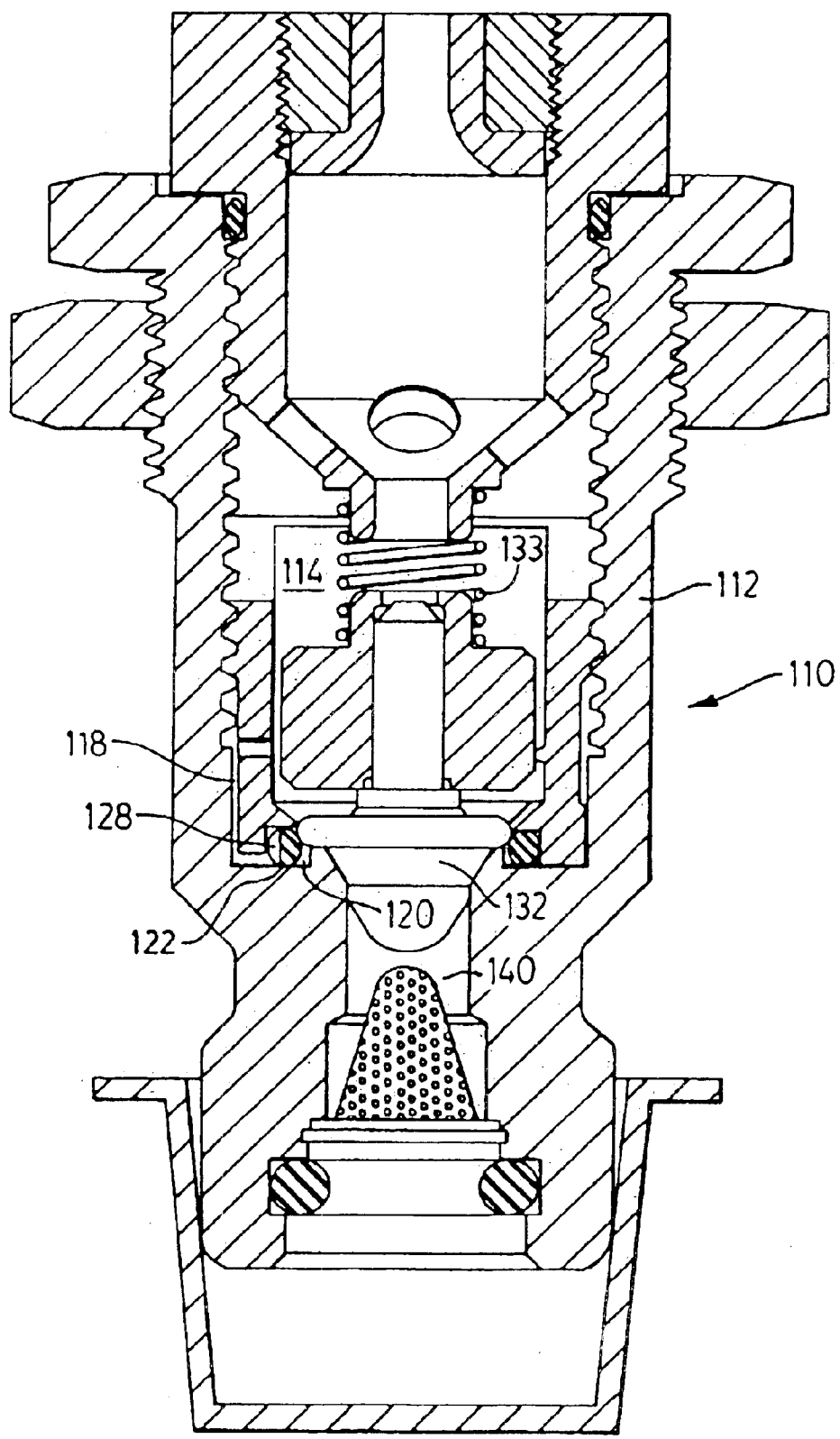
FIG. 4 is a sectional elevation view of another embodiment of the valve of the present invention.
Figure 5:
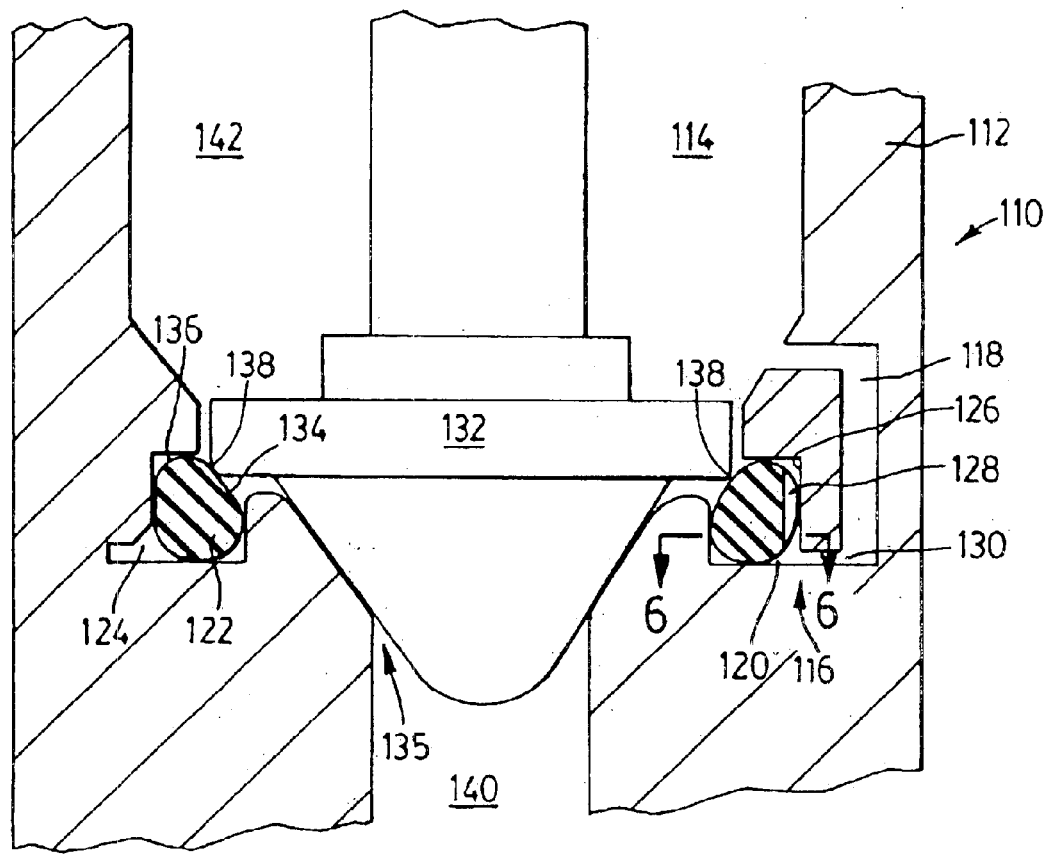
FIG. 5 is a detailed sectional elevation view, partly cut-away, of the valve seat area of the valve in FIG. 4.
Figure 6:
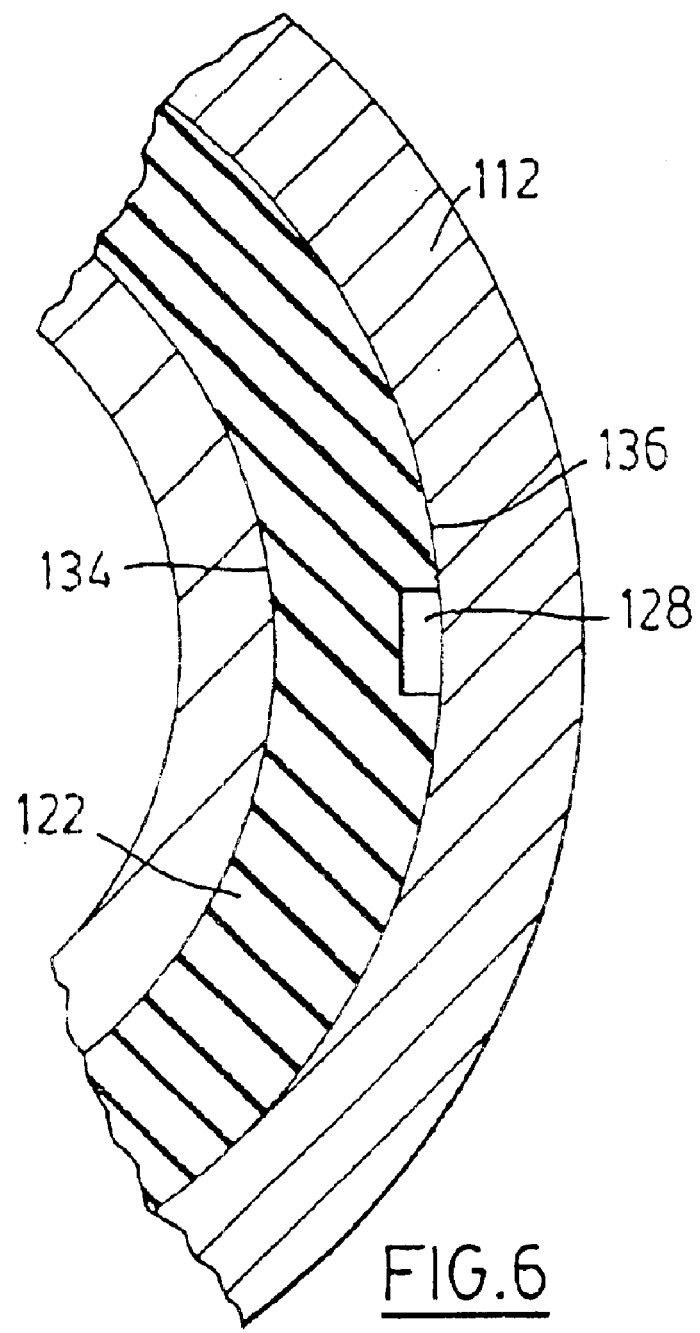
FIG. 6 is a plan view of the valve illustrated in FIGS. 4 and 5, taken along the lines 6—6 in FIG. 5.

Referring to FIGS. 4–6, in another embodiment, the present invention provides a valve 110 comprising a body 112 including a fluid passage 114, a valve seat 116, and a communication channel 118. The valve seat 116 includes a sealing gland 120 and a resilient valve seat member 122 disposed and supported within a cavity 124 of the sealing gland 120. The resilient valve seat member 122 includes a notch 128 opposing a support surface 126 of the sealing gland 120. The notch 128 defines a channel which forms part of the cavity 124 of the sealing gland 120. The communication channel 118 effects communication between the fluid passage 114 and the cavity 124, and, therefore, the notch 128, through an aperture 130 provided in the sealing gland 120. In this respect, the communication channel 118 provides a means for effecting communication between the cavity 124 and a source of fluid pressure (in this case, the fluid passage 114).

The body 112 is made of a material which is significantly harder than the material of construction of the valve seat member 122. The valve seat member 122 is made of a resilient material, such as an elastomeric rubber, for example, nitrile rubber. In turn, the body is made of steel, such as stainless steel, brass, or a hard polymer.

A valve sealing member 132 is disposed within the passage 114. The valve sealing member 132 is configured to seal against the valve seat 116. In this respect, the valve sealing member 132 is configured to seat against or engage the valve seat member 122 which is disposed within the sealing gland 120 of the valve seat 116.

The valve sealing member 132 can be of the form which is biased to close an orifice 135 defined by the valve seat 16. In this respect, the valve sealing member 132 can be urged into engagement with the valve seat member 122 by a resilient member 133, such as a compression spring. The valve sealing member 132 is unseated by fluid pressure upstream of the valve sealing member 132 (i.e. in a direction opposite from the direction in which the force imparted by the resilient member acts upon the valve sealing member 132). It is understood that the present invention is not limited to such spring-loaded, one way valves. For example, the present invention may be incorporated in solenoid-actuated valves and pintle valves.

The valve seat member 122 includes a first pressure responsive surface 134 and a second pressure responsive surface 136. The first pressure responsive surface 134 is exposed to the fluid passage 114. The second pressure responsive surface 136 is configured to receive application of a fluid pressure, and is opposite the first pressure responsive surface 134.

The first pressure responsive surface 134 is configured to engage the valve sealing member 132 to effect sealing of the valve sealing member 132 to the valve seat 116. The first pressure responsive surface receives 134 application of forces from the valve sealing member 132 (when the valve sealing member 132 engages the first pressure responsive surface 134) and the fluid pressure forces in the first fluid passage 114. The first pressure responsive surface 134 includes a valve engaging surface 138, configured to engage the valve sealing member 132.

Sealing of the valve sealing member 132 to the valve seat 116 requires that the valve seat member 122 bridge the gap across the sealing gland 120 upstream 140 of the valve engaging surface 138. In this respect, the valve seat member 122 is maintained engaged to the sealing gland 120 upstream 140 of the valve engaging surface 138 of the first pressure responsive surface 134.

The valve seat member 122 can be in the form of an o-ring or any other compliant seal of various cross-sectional shapes.

To maintain the necessary engagement between the valve seat member 122 and the sealing gland 120, a fluid pressure is introduced into the cavity 124 of the sealing gland 120 to act upon the second pressure responsive surface 136. In this respect, this fluid pressure opposes or counterbalances the above-described forces acting on the first pressure responsive surface 134 such that the valve seat member remains engaged to the sealing gland 120.

As perhaps best shown in FIG. 4, the notch 128 is deliberately formed in the second pressure responsive surface 136 of the valve seat member 122, and functions as a channel to effect distribution of fluid pressure throughout the cavity 124, the fluid pressure being introduced into the cavity 124 through the aperture 130 in the sealing gland 120. The notch 128 is configured so that the valve seat member 122 is not capable, upon deformation, of collapsing the notch 128. The notch 128 is provided to mitigate against the risk that the valve seat member 122 engages the sealing gland 120 and impedes distribution of fluid pressure throughout the cavity 124. By impeding distribution in this manner, the effectiveness of the introduced fluid pressure in opposing or counterbalancing the above-described forces being applied to the first pressure responsive surface 134 would be compromised.

In this respect, the notch 128 opposes the support surface 126 of the sealing gland 120, and is configured to facilitate application of a fluid pressure on the valve seat member 122, and specifically the second pressure responsive surface 136 of the valve seat member 122, to prevent leakage through the orifice 135 when the valve sealing member 132 is seated against the valve seat member 122. Similarly, the notch 128 is also configured to facilitate the application of the fluid pressure on the valve seat member 122 to prevent leakage through the orifice 135 and between the valve sealing member 132 and the sealing gland 120 when the valve sealing member 132 is seated against the valve seat member 122. The notch 128 is also configured to facilitate application of the fluid pressure on the second pressure responsive surface 136 to counterbalance the application of the above-described forces on the first pressure responsive surface 134 of the valve seat member 122.

In one embodiment, the notch 128 is characterized by a depth of at least 0.00254 millimeters (100 microinches). In another embodiment, the depth of notch 128 is at least 0.0254 millimeters (0.001 inches). Preferably, the notch 128 is characterized by a depth of between 0.508 millimeters (0.020 inches) and 0.762 millimeters (0.030 inches).

Figure 7:
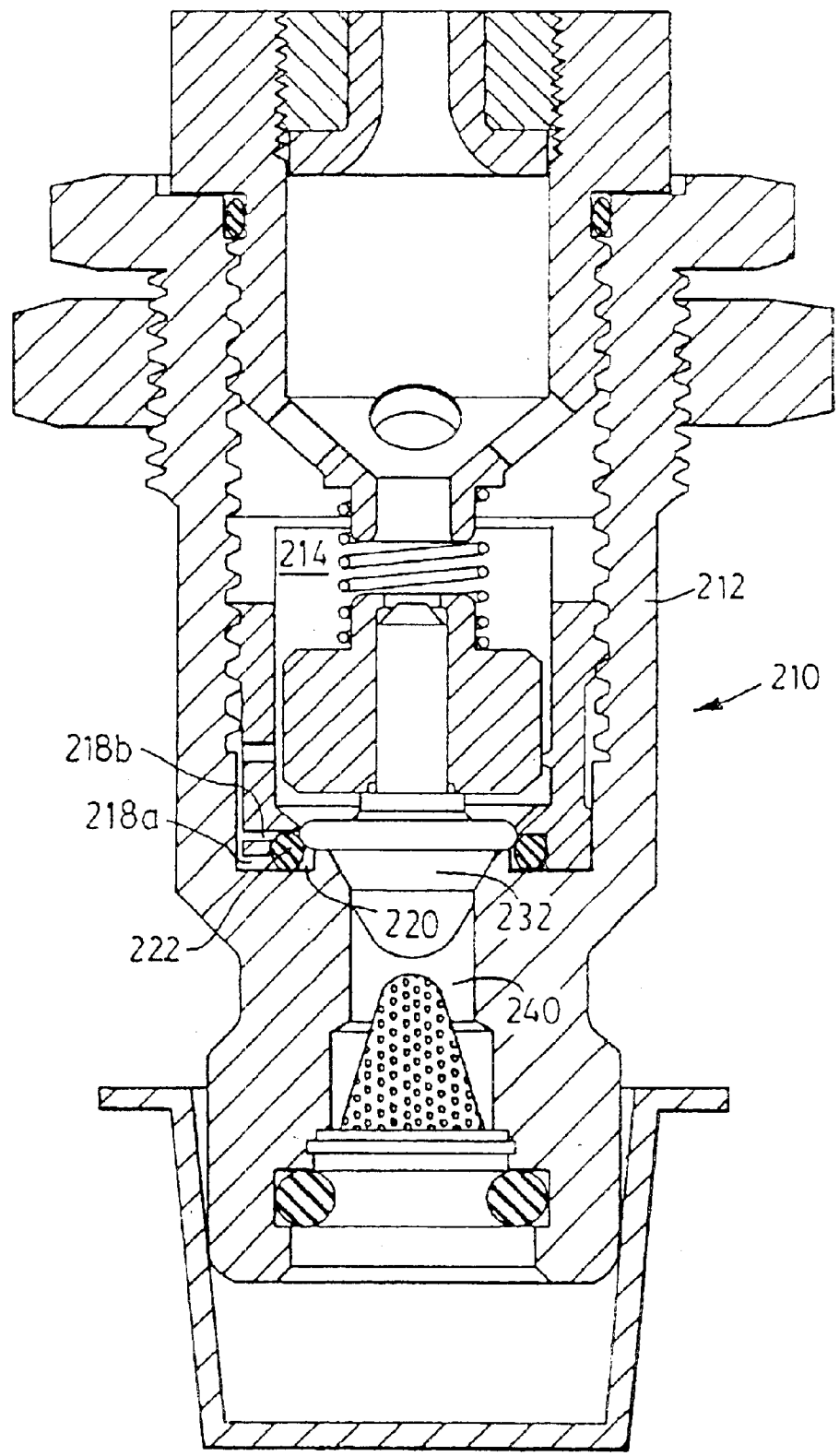
FIG. 7 is a sectional elevation view of another embodiment of the valve of the present invention.
Figure 8:
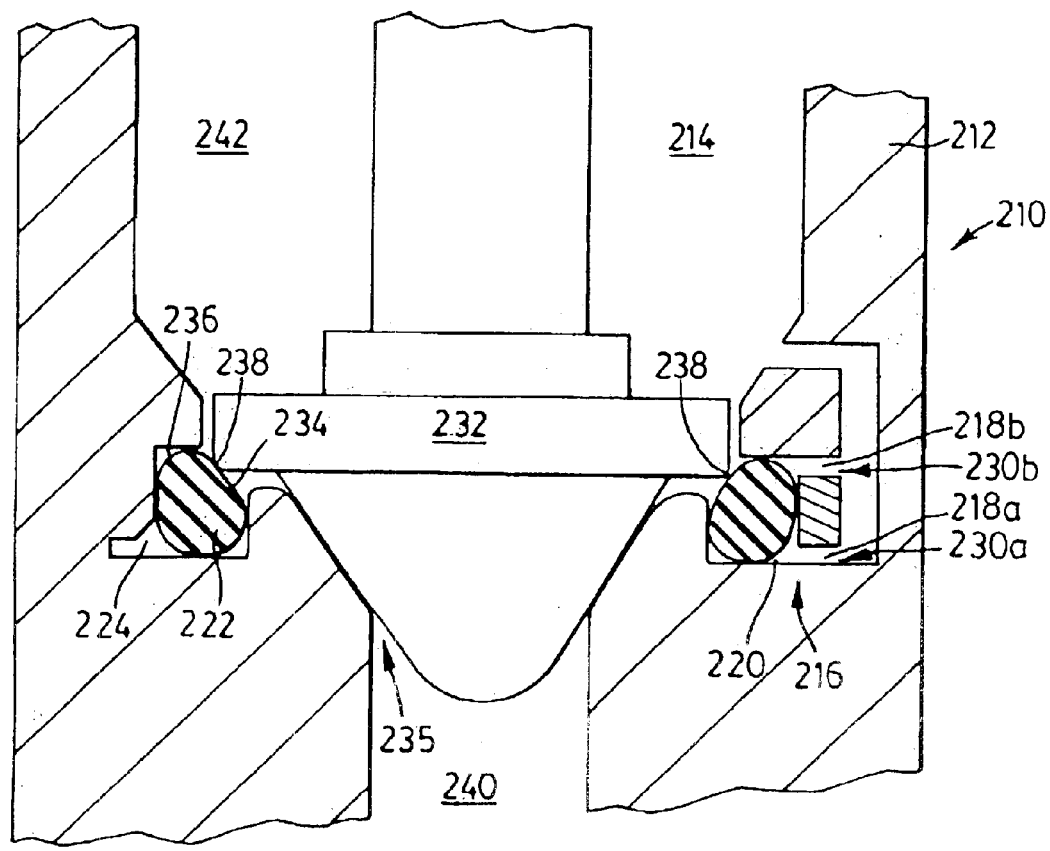
FIG. 8 is a sectional elevation view, partly cut-away, of the valve seat area of the valve illustrated in FIG. 7.

Referring to FIGS. 7 and 8, in another embodiment, the present invention provides a valve 210 comprising a body 212 including a fluid passage 214, a valve seat 216, and first and second communication channels 218a, 218b. The valve seat includes a sealing gland 220 and a resilient valve seat member 222 disposed and supported within a cavity 224 of the sealing gland 220. The sealing gland 220 includes first and second spaced apart apertures 230a, 230b communicating with the first and second communication channels 218a, 218b, respectively. The communication channels 218a, 218b effects communication between the fluid passage 214 and the cavity 224, thereby providing a means for effecting communication between the cavity 224 and a source of fluid pressure (in this case, the fluid passage 214).

The body 212 is made of a material which is significantly harder than the material of construction of the valve seat member 222. The valve seat member 222 is made of a resilient material, such as an elastomeric rubber, for example, nitrile rubber. In turn, the body is made of steel, such as stainless steel, brass, or a hard polymer.

A valve sealing member 232 is disposed within the passage 214. The sealing member 232 is configured to seal against the valve seat 216. In this respect, the valve sealing member 232 is configured to seat against or engage the valve seat member 222 which is disposed within the sealing gland 220.

The valve seat member 222 includes a first pressure responsive surface 234 and a second pressure responsive surface 236. The first pressure responsive surface 234 is exposed to the fluid passage 214. The second pressure responsive surface 236 is configured to receive application of a fluid pressure from within the cavity 224, and is opposite the first pressure responsive surface 234.

The first pressure responsive surface 234 is configured to engage the valve sealing member 232 to effect sealing of the valve sealing member 232 to the valve seat 216. The first pressure responsive surface 232 receives application of forces from the valve sealing member 232 (when the valve sealing member 232 engages the first pressure responsive surface 234) and the fluid pressure forces in the fluid passage 214. The first pressure responsive surface 234 includes a valve engaging surface 238, configured to engage the valve sealing member 232.

Sealing of the valve sealing member 232 to the valve seat 216 requires that the valve seat member 222 bridge the gap across the sealing gland 220 upstream 240 of the valve engaging surface 238. In this respect, the valve seat member 222 is maintained engaged to the sealing gland 220 upstream 240 of the valve engaging surface 238 of the first pressure responsive surface 234.

The valve seat member can be in the form of an o-ring or any other compliant seal of various cross-sectional shapes.

To maintain the necessary engagement between the valve seat member 222 and the sealing gland 220, a fluid pressure is introduced into the cavity 224 of the sealing gland to act upon the second pressure responsive surface 236. In this respect, this fluid pressure opposes or counterbalances the above-described forces acting on the first pressure responsive surface such that the valve seat member 222 remains engaged to the sealing gland 220.

The first and second spaced apart apertures 230a, 230b are formed in the sealing gland 220 and are each configured to act as a means for introducing fluid pressure into the cavity 224. In this respect, the first and second apertures 230a, 230b function as first and second means for introducing fluid pressure into the sealing gland cavity 224. Introducing fluid pressure into the cavity 224 at different points within the sealing gland 220 functions as a means for effecting distribution of fluid pressure through the cavity 224. The multiple points of introduction are provided to mitigate against the risk that the valve seat member 222 engages the sealing gland 220 to form multiple isolated cavities and thereby impeding distribution of fluid pressure through the cavity 224. By impeding distribution in this manner, the effectiveness of the introduced fluid pressure in opposing or counterbalancing the above-described forces being applied to the first pressure responsive surface 234 would be compromised.

In this respect, the first and second means for introducing fluid pressure into the sealing gland cavity 220 are configured to facilitate application of a fluid pressure on the valve seat member 222, and specifically the second pressure responsive surface 236 of the valve seat member 222, to prevent leakage through an orifice 235 when the valve sealing member 232 is seated against the valve seat member 222. Similarly, the first and second means are also configured to facilitate the application of the distributed fluid pressure on the valve seat member 222 to prevent leakage through the orifice 235 and between the valve sealing member 232 and the sealing gland 220 when the valve sealing member 232 is seated against the valve seat member 232. The first and second means are also configured to facilitate application of the fluid pressure on the second pressure responsive surface 236 to counterbalance the application of the above-described forces on the first pressure responsive surface 234 of the valve seat member 222. It is understood that the invention is not limited to the provision of only first and second means for introducing fluid pressure into the sealing gland cavity, and further such means may be provided to effect distribution of fluid pressure within the sealing gland cavity 224 with a view to opposing forces applied to the first pressure responsive surface 234 and maintaining the necessary engagement between the valve seat member 222 and the sealing gland 220

Although the disclosure describes and illustrates preferred embodiments of the invention, it is to be understood that the invention is not limited to these particular embodiments. Many variations and modifications will now occur to those skilled in the art. For definition of the invention, reference is to be made to the appended claims.

What is claimed is:

1. A valve for controlling a fluid, the fluid exerting a fluid pressure, the valve comprising:
   a body, the body including:
      a fluid passage;
      a valve seat defining an orifice, and including:
         a sealing gland including a support surface, the support surface including a notch;
         a resilient valve seat member disposed within the sealing gland;
      a valve sealing member disposed within the fluid passage and configured to seat against the valve seat member to effect sealing of the valve sealing member to the valve seat and thereby close the orifice;
      the notch being configured to facilitate the application of the fluid pressure on the valve seat member to prevent leakage through the orifice and between the valve sealing member and the sealing gland when the valve sealing member is seated against the valve seat member;
      the valve seat member including:
         a first pressure responsive surface, exposed to the fluid passage, and including a valve engaging surface portion, wherein the valve engaging surface portion is configured to engage the valve sealing member to effect sealing of the valve sealing member to the valve seat;
         a second pressure responsive surface configured to receive the application of the fluid pressure;
      the notch being positioned to face the second pressure responsive surface; and
      the notch being configured to facilitate the application of the fluid pressure on the second pressure responsive surface to counterbalance applications of forces on the first pressure responsive surface.

2. A valve as claimed in claim 1, wherein the valve seat member is supported within the sealing gland.

3. A valve as claimed in claim 2, wherein the notch is characterized by a depth of at least 0.00254 millimeters (100 microinches).

4. A valve as claimed in claim 3, wherein the notch is characterized by a depth of at least 0.0254 millimeters (0.001 inches).

5. A valve as claimed in claim 4, wherein the first pressure responsive surface is located on the valve seat member substantially opposite to the second pressure responsive surface.

6. A valve as claimed in claim 5, wherein the fluid passage is in fluid communication with the notch.

7. A valve as claimed in claim 6, wherein the sealing gland includes a cavity, and wherein the cavity includes a channel between the support surface and the second pressure responsive member, the channel being defined by the notch.

8. A valve as claimed in claim 7, wherein the valve further includes a pressure communication passage connecting the cavity of the sealing gland and the fluid passage.

9. A valve as claimed in claim 8, wherein the sealing gland includes an aperture, and wherein the pressure communication passage is connected to the aperture.

10. A valve for controlling a fluid, the fluid exerting a fluid pressure, the valve comprising:
    a body, the body including:
       a fluid passage;
       a valve seat defining an orifice, including:
          a sealing gland;
          a resilient valve seat member disposed within the sealing gland, and including a notch;
          a valve sealing member disposed within the fluid passage and configured to seat against the valve seat member to effect sealing of the valve sealing member to the valve seat and thereby close the orifice;
       the notch being configured to facilitate the application of the fluid pressure on the valve seat member to prevent leakage through the orifice and between the valve sealing member and the sealing gland when the valve sealing member is seated against the valve seat member;
       the valve seat member including:
          a first pressure responsive surface, exposed to the fluid passage, and including a valve engaging surface portion, wherein the valve engaging surface portion is configured to engage the valve sealing member to effect sealing of the valve sealing member to the valve seat; and
          a second pressure responsive surface configured to receive the application of the fluid pressure;
          wherein the notch is configured to facilitate the application of the fluid pressure on the second pressure responsive surface to maintain engagement of the valve seat member to the sealing gland upstream of the valve engaging surface.

11. A valve as claimed in claim 10, wherein the notch is configured to facilitate the application of the fluid pressure on the second pressure responsive surface to counterbalance applications of forces on the first pressure responsive surface.

12. A valve as claimed in claim 11, wherein the sealing gland includes a support surface, and wherein the support surface faces the notch.

13. A valve as claimed in claim 12, wherein the valve seat member is supported within the sealing gland.

14. A valve as claimed in claim 13, wherein the notch is characterized by a depth of at least 0.00254 millimeters (100 microinches).

15. A valve as claimed in claim 14, wherein the notch is characterized by a depth of at least 0.0254 millimeters (0.001 inches).

16. A valve seal as claimed in claim 15, wherein the first pressure responsive surface is located on the valve seat member substantially opposite to the second pressure responsive surface.

17. A valve as claimed in claim 16, wherein the fluid passage is in fluid communication with the notch.

18. A valve as claimed in claim 17, wherein the valve further includes a pressure communication passage effecting fluid communication between the cavity of the sealing gland and the fluid passage.

19. A valve as claimed in claim 18, wherein the sealing gland includes a cavity and wherein the cavity includes a channel between the support surface and the second pressure responsive member, the channel being defined by the notch.

20. A valve as claimed in claim 19, wherein the gland includes an aperture, and wherein the pressure communication passage is coupled to the aperture.

21. A valve for controlling a fluid, the fluid exerting a fluid pressure, the valve comprising:
- a body, the body including:
  - a fluid passage;
  - a valve seat defining an orifice, including:
    - a sealing gland including a cavity;
    - a resilient valve seat member disposed within the sealing gland;
  - a valve sealing member disposed within the fluid passage and configured to seat against the valve seat member to effect sealing of the valve sealing member to the valve seat and thereby close the orifice;
  - the sealing gland including at least two spaced apart apertures, configured to distribute fluid pressure within the cavity to act upon the valve seat member to prevent leakage through the orifice when the valve sealing member is seated against the valve seat member; and
  - said at least two spaced apart apertures being configured to facilitate the application of the distributed fluid pressure on the valve seat member to prevent leakage through the orifice and between the valve sealing member and the sealing gland when the valve sealing member is seated against the valve seat member.

22. A valve as claimed in claim 21, wherein the valve seat member includes:
- a first pressure responsive surface, exposed to the fluid passage, and including a valve engaging surface portion, wherein the valve engaging surface portion is configured to engage the valve sealing member to effect sealing of the valve sealing member to the valve seat; and
- a second pressure responsive surface configured to receive the application of the distributed fluid pressure;

wherein the at least two spaced apart apertures are configured to facilitate the application of the distributed fluid pressure within the cavity on the second pressure responsive surface to maintain engagement of the valve seat member to the sealing gland upstream of the valve engaging surface portion.

23. A valve as claimed in claim 22, wherein the apertures are configured to facilitate the application of the fluid pressure on the second pressure responsive surface to counterbalance applications of forces on the first pressure responsive surface.

24. A valve as claimed in claim 23, wherein the valve seat member is supported within the sealing gland.

25. A valve seal as claimed in claim 24, wherein the first pressure responsive surface is opposite to the second pressure responsive surface.

26. A valve for controlling flow of a fluid, the fluid exerting a fluid pressure, the valve having:
- a body including a fluid passage for the fluid, and a valve seat positioned adjacent to the fluid passage at an orifice coaxial with the fluid passage;
- the valve seat including a sealing gland comprising:
  - a sealing gland defining a cavity therein, the sealing gland having a support surface thereon adjacent to the cavity;
  - a resilient valve seat member disposed and supported within the cavity, the valve seat member including a first pressure responsive surface adjacent to the orifice and a second pressure responsive surface substantially opposed to the first pressure responsive surface;
- the support surface including a notch for positioning a portion of the support surface a predetermined distance apart from the second pressure responsive surface;
- a valve sealing member disposed in the fluid passage and movable between an engaged position, in which the valve sealing member is seated on the valve seat to block fluid flow through the orifice, and an open position, in which fluid flow through the orifice is permitted;
- a resilient member for urging the valve sealing member into the engaged position;
- the fluid passage including an upstream portion disposed upstream of the valve sealing member when the valve sealing member is in the engaged position, and a downstream portion disposed downstream of the valve sealing member when the valve sealing member is in the engaged position;
- the valve sealing member being urged into the open position by the fluid in the upstream portion; and
- the body including a communication channel for fluid communication between the downstream portion and the cavity in the sealing gland, such that fluid pressure in the cavity acts upon the second pressure responsive surface to urge the valve seat member to seal the orifice when the valve sealing member is in the engaged position.

27. A valve for controlling flow of a fluid, the fluid exerting a fluid pressure, the valve having:
- a body including a fluid passage for the fluid, and a valve seat positioned adjacent to the fluid passage at an orifice coaxial with the fluid passage;
- the valve seat including a sealing gland comprising:
  - a sealing gland defining a cavity therein, the sealing gland having a support surface thereon adjacent to the cavity;
  - a resilient valve seat member disposed and supported within the cavity, the valve seat member including a first pressure responsive surface adjacent to the orifice and a second pressure responsive surface substantially opposed to the first pressure responsive surface;
- the second pressure responsive surface including a notch for positioning a portion of the second pressure responsive surface a predetermined distance apart from the support surface;
- a valve sealing member disposed in the fluid passage and movable between an engaged position, in which the valve sealing member is seated on the valve seat to block fluid flow through the orifice, and an open position, in which fluid flow through the orifice is permitted;
- a resilient member for urging the valve sealing member into the engaged position;
- the fluid passage including an upstream portion disposed upstream of the valve sealing member when the valve sealing member is in the engaged position, and a downstream portion disposed downstream of the valve sealing member when the valve sealing member is in the engaged position;
- the valve sealing member being urged into the open position by the fluid in the upstream portion; and the body including a communication channel for fluid communication between the downstream portion and the cavity in the sealing gland, such that fluid pressure in the cavity acts upon the second pressure responsive surface to urge the valve seat member to seal the orifice when the valve sealing member is in the engaged position.

28. A valve for controlling flow of a fluid, the fluid exerting a fluid pressure, the valve having:

a body including a fluid passage for the fluid, and a valve seat positioned adjacent to the fluid passage at an orifice coaxial with the fluid passage;

the valve seat including a sealing gland comprising:

a sealing gland defining a cavity therein, the sealing gland having a support surface thereon adjacent to the cavity;

a resilient valve seat member disposed and supported within the cavity, the valve seat member including a first pressure responsive surface adjacent to the orifice and a second pressure responsive surface substantially opposed to the first pressure responsive surface;

a valve sealing member disposed in the fluid passage and movable between an engaged position, in which the valve sealing member is seated on the valve seat to block fluid flow through the orifice, and an open position, in which fluid flow through the orifice is permitted;

a resilient member for urging the valve sealing member into the engaged position;

the fluid passage including an upstream portion disposed upstream of the valve sealing member when the valve sealing member is in the engaged position, and a downstream portion disposed downstream of the valve sealing member when the valve sealing member is in the engaged position;

the valve sealing member being urged into the open position by the fluid in the upstream portion;

the body including at least two communication channels for fluid communication between the downstream portion and the cavity in the sealing gland, such that fluid pressure in the cavity acts upon the second pressure responsive surface to urge the valve seat member to seal the orifice when the valve sealing member is in the engaged position.

\* \* \* \* \*

UNITED STATES PATENT AND TRADEMARK OFFICE
CERTIFICATE OF CORRECTION

PATENT NO. : 6,845,965 B2
DATED : January 25, 2005
INVENTOR(S) : Henry A. Lanting and Po P. Woo It is certified that error appears in the above-identified patent and that said Letters Patent is hereby corrected as shown below:

Title page,
Item [73], Assignee, replace "GPI" with -- GFI --.

Column 9,
Line 10, replace Claim 1 with the following:
-- 1. A valve for controlling a fluid, the fluid exerting a fluid pressure, the valve
   comprising:
      a body, the body including:
         a fluid passage;
         a valve seat defining an orifice, and including:
            a sealing gland including a support surface, the support surface
            including a notch;
            a resilient valve seat member disposed within the sealing gland;
         a valve sealing member disposed within the fluid passage and configured
         to seat against the valve seat member to effect sealing of the valve sealing
         member to the valve seat and thereby close the orifice;
      the notch being configured to facilitate the application of the fluid pressure on
      the valve seat member to prevent leakage through the orifice and between the
      valve sealing member and the sealing gland when the valve sealing member
      is seated against the valve seat member;
      the valve seat member including:
         a first pressure responsive surface, exposed to the fluid passage, and
         including a valve engaging surface portion, wherein the valve engaging
         surface portion is configured to engage the valve sealing member to effect
         sealing of the valve sealing member to the valve seat;
         a second pressure responsive surface configured to receive the application
         of the fluid pressure;
      the notch being positioned to face the second pressure responsive surface;
      and
      the notch being configured to facilitate the application of the fluid pressure
      on the second pressure responsive surface to counterbalance applications of
      forces on the first pressure responsive surface. --.

UNITED STATES PATENT AND TRADEMARK OFFICE
CERTIFICATE OF CORRECTION

PATENT NO.     : 6,845,965 B2
DATED          : January 25, 2005
INVENTOR(S)    : Henry A. Lanting and Po P. Woo It is certified that error appears in the above-identified patent and that said Letters Patent is hereby corrected as shown below:

<u>Column 10,</u>
Line 1, replace Claim 10 with the following:
-- 10. A valve for controlling a fluid, the fluid exerting a fluid pressure, the valve comprising:
    a body, the body including:
        a fluid passage;
        a valve seat defining an orifice, including:
            a sealing gland;
            a resilient valve seat member disposed within the sealing gland, and including a notch;
            a valve sealing member disposed within the fluid passage and configured to seat against the valve seat member to effect sealing of the valve sealing member to the valve seat and thereby close the orifice;
        the notch being configured to facilitate the application of the fluid pressure on the valve seat member to prevent leakage through the orifice and between the valve sealing member and the sealing gland when the valve sealing member is seated against the valve seat member;
        the valve seat member including:
            a first pressure responsive surface, exposed to the fluid passage, and including a valve engaging surface portion, wherein the valve engaging surface portion is configured to engage the valve sealing member to effect sealing of the valve sealing member to the valve seat; and
            a second pressure responsive surface configured to receive the application of the fluid pressure;
        wherein the notch is configured to facilitate the application of the fluid pressure on the second pressure responsive surface to maintain engagement of the valve seat member to the sealing gland upstream of the valve engaging surface. --.

UNITED STATES PATENT AND TRADEMARK OFFICE
CERTIFICATE OF CORRECTION

PATENT NO. : 6,845,965 B2
DATED : January 25, 2005
INVENTOR(S) : Henry A. Lanting and Po P. Woo It is certified that error appears in the above-identified patent and that said Letters Patent is hereby corrected as shown below:

Column 11,
Line 1, replace Claim 21 with the following:
-- 21.   A valve for controlling a fluid, the fluid exerting a fluid pressure, the valve comprising:
   a body, the body including:
     a fluid passage;
     a valve seat defining an orifice, including:
     a sealing gland including a cavity;
     a resilient valve seat member disposed within the sealing gland;
   a valve sealing member disposed within the fluid passage and configured to seat against the valve seat member to effect sealing of the valve sealing member to the valve seat and thereby close the orifice;
   the sealing gland including at least two spaced apertures, configured to distribute fluid pressure within the cavity to act upon the valve seat member to prevent leakage through the orifice when the valve sealing member is seated against the valve seat member; and
   said at least two spaced apart apertures being configured to facilitate the application of the distributed fluid pressure on the valve seat member to prevent leakage through the orifice and between the valve sealing member and the sealing gland when the valve sealing member is seated against the valve seat member. --.

Signed and Sealed this

Twenty-first Day of February, 2006

JON W. DUDAS
*Director of the United States Patent and Trademark Office*